United States Patent
Weng et al.

(10) Patent No.: US 7,439,721 B2
(45) Date of Patent: Oct. 21, 2008

(54) CONSTANT-ON-TIME POWER-SUPPLY CONTROLLER AND RELATED SYSTEM AND METHOD

(75) Inventors: Da Feng Weng, Cupertino, CA (US); Jinrong Qian, Plano, TX (US)

(73) Assignee: Intersil Americas Inc., Milpitas, CA (US)

( * ) Notice: Subject to any disclaimer, the term of this patent is extended or adjusted under 35 U.S.C. 154(b) by 29 days.

(21) Appl. No.: 11/443,838

(22) Filed: May 30, 2006

(65) Prior Publication Data
US 2006/0284609 A1    Dec. 21, 2006

Related U.S. Application Data

(60) Provisional application No. 60/687,165, filed on Jun. 3, 2005.

(51) Int. Cl.
*G05F 1/00* (2006.01)
(52) U.S. Cl. .......................... 323/286; 323/287
(58) Field of Classification Search ................. 323/282, 323/284–285, 289–290, 286, 287
See application file for complete search history.

(56) References Cited

U.S. PATENT DOCUMENTS

| | | | |
|---|---|---|---|
| 6,181,120 B1* | 1/2001 | Hawkes et al. | 323/282 |
| 6,492,794 B2* | 12/2002 | Hwang | 323/285 |
| 6,495,995 B2 | 12/2002 | Groom et al. | |
| 6,583,610 B2 | 6/2003 | Groom et al. | |
| 2003/0142519 A1 | 7/2003 | Walters et al. | |
| 2005/0007087 A1 | 1/2005 | Pullen et al. | |
| 2005/0258814 A1* | 11/2005 | Chen et al. | 323/285 |

OTHER PUBLICATIONS

Integrated XScale Regulator Data Sheet ISL6271A, FN9171.1, Intersil Americas Inc., 2004.
Quick-PWM Step-Down Controllers with Inductor Saturation Protection and Dynamic Output Voltages, MAX1992/MAX1993, Maxim Integrated Products, 2002.
5-Bit, 2 Phase Synchronous Buck Controller with 2 LDOs, AQ9220, Arques Technology, 2003.
Dual-Output Voltage Regulator for DDR SDRAM, AQ9260, Arques Technology, 2004.
High-Speed Step-Down Controller for Notebook Computers, MAX1714, Maxim Integrated Products, 1999.
Integrated DDR Power-Supply Solutions for Desktops, Notebooks, and Graphic Cards, MAX8550/MAX8551, Feb. 2004.

* cited by examiner

*Primary Examiner*—Shawn Riley
(74) *Attorney, Agent, or Firm*—Paul A. Bernkopf; Graybeal Jackson Haley LLP (57) ABSTRACT

A constant-on-time power-supply controller includes an adder and a control circuit. The adder generates a sum of a sense voltage and a regulated output voltage generated by a filter inductor. The sense voltage is generated by a sense circuit that sources a current to the filter inductor while the inductor is uncoupled from an input voltage, and the sense voltage is related to the current. The control circuit couples the filter inductor to the input voltage for a predetermined time in response to the sum having a predetermined relationship to a reference voltage. Such a power-supply controller may yield a relatively tight regulation of the output voltage even with a power supply having with a low-ESR filter capacitor, and may do so with little or no additional compensation circuitry as compared to prior controllers and with no additional pin on the power-supply-controller chip.

22 Claims, 7 Drawing Sheets

FIG. 9

CONSTANT-ON-TIME POWER-SUPPLY CONTROLLER AND RELATED SYSTEM AND METHOD

CLAIM OF PRIORITY

This application claims priority to U.S. Provisional Application Ser. No. 60/687,165, filed on Jun. 3, 2005, which is incorporated by reference.

BACKGROUND

A traditional constant-on-time buck-converter regulates an output voltage by using the ripple on the output voltage as a PWM ramp signal to control the turn-on instant of the transistor that couples the input voltage to the filter inductor.

A constant-on-time buck converter may have a number of advantages over other types of power supplies. For example, a constant-on-time buck converter typically operates at a constant-frequency for steady-state loads, has high efficiency over a wide load range, requires few of any additional compensation components and responds quickly to changes in the load. Furthermore, such buck converter may transition relatively seamlessly between a pulse-width modulation mode (normal load conditions where switching frequency relatively constant) and a pulse-frequency modulation mode (heavy or light load conditions where the switching frequency increases or decreases, respectively).

Figure 1:
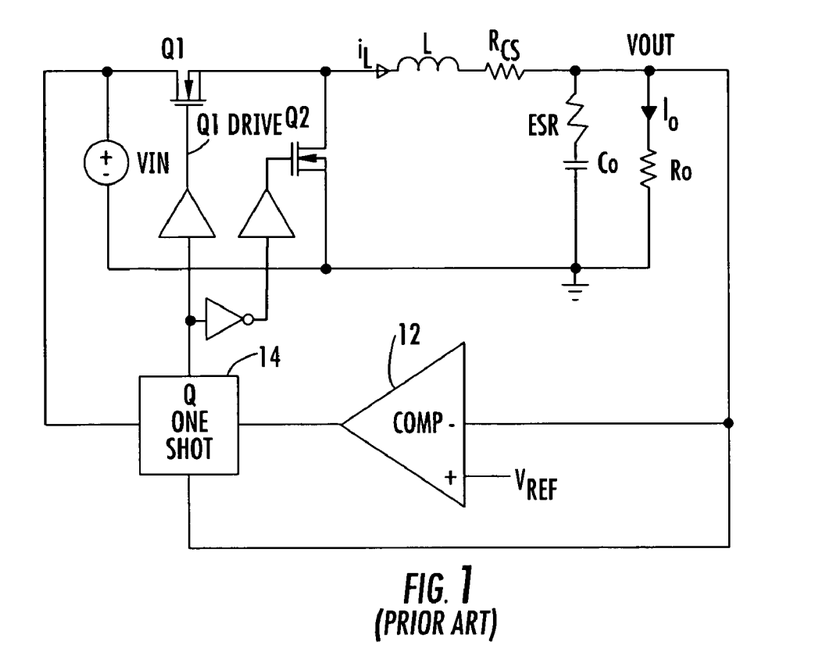
FIG. 1 is a schematic diagram of a traditional constant-on time power supply.
Figures 2A, 2B:
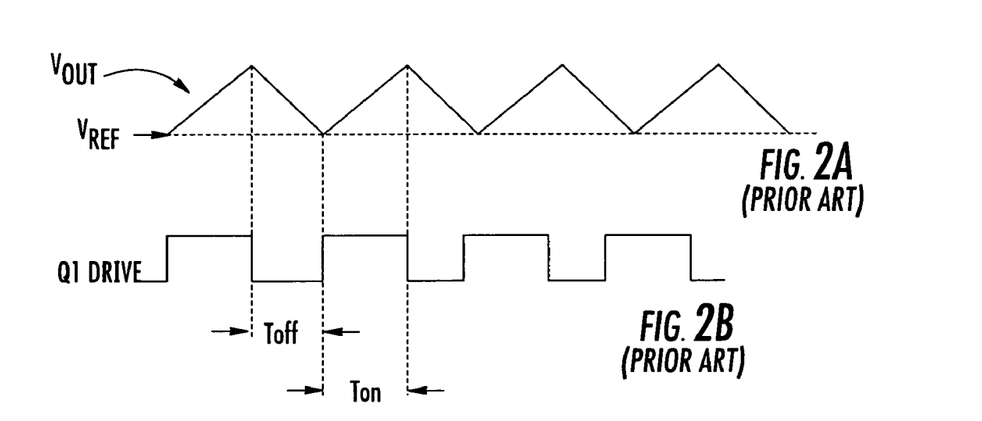
FIGS. 2A-2B are respective plots of some of the voltages of FIG. 1.

FIG. 1 is a schematic diagram of a traditional constant-on time buck converter, i.e., power supply 10, and FIGS. 2A and 2B are respective plots of the voltages VOUT, Vref, and $Q1_{drive}$ of FIG. 1.

Referring to FIGS. 1-2B, the operation of the power supply 10 is described.

During a discharge time Toff, the transistor Q1 is deactivated and the transistor Q2 is activated such that the decaying current $I_L$ flowing through the inductor L also flows through the closed transistor Q2. As $I_L$ decays, VOUT ramps downward toward Vref as shown in FIG. 2A.

When VOUT ramps below Vref, a comparator 12 activates a one shot 14, which activates Q1 and deactivates Q2 for a predetermined "constant-on" or charge time Ton. During the charge time Ton, an increasing current $I_L$ flows from the input voltage Vin, through the transistor Q1 and the inductor L, to the filter capacitor Co and load Ro. As $I_L$ increases, VOUT ramps upward as shown in FIG. 2.

After the elapse of the predetermined charge time Ton, the one shot 14 deactivates Q1 and activates Q2 and the above-described cycle repeats.

There are two components to the ripple on VOUT.

The first component is the in-phase component, which is the voltage generated by current flowing through the equivalent series resistance (ESR) of the output filter capacitor Co. The in-phase component is in phase with the inductor current $I_L$, because the voltage across a resistor is in phase with the current through a resistor.

The second component is the out-of-phase component, which is generated by the charging and discharging of the output filter capacitor Co. The out-of-phase component is out of phase with the inductor current $I_L$, because the phase of the voltage across a capacitor lags the phase of the current through the capacitor.

Therefore, as discussed below, the value of the ESR affects the stability of the feedback loop of the power supply 10.

Generally, the loop is stable where $f_{ESR} \leq f_{SW}/\pi$, where $f_{SW}=1/(Ton+Toff)$ (the switching frequency), and $f_{ESR}=1/(2\pi \cdot ESR \cdot Co)$.

Consequently, as long as both the ESR and output filter capacitor Co are relatively large (e.g. ESR$\geq$40 milliohms (m$\Omega$)) then the in-phase component of the ripple on VOUT is the dominant component, and thus the phase shift of the ripple relative to the inductor current $I_L$ is relatively small. That is, the in-phase component of the ripple caused by the portion of $I_L$ that flows through the ESR "swamps out" the out-of-phase component of the ripple.

Therefore, a traditional constant-on-time power supply includes an output filter capacitor Co having an ESR that is large enough to provide a stable feedback loop.

Recently, filter capacitors having ESR values of 5 m$\Omega$ or less have become available; it is sometimes desirable to use such a low-ESR filter capacitor in a buck-converter power supply with a relatively high steady-state switching frequency to reduce the size and cost of the converter.

Unfortunately, using such a low-ESR capacitor may render a traditional constant-on-time power supply unstable. An unstable power supply may have too large of a voltage tolerance VT as described below in conjunction with FIG. 3, or may oscillate.

Figure 3:
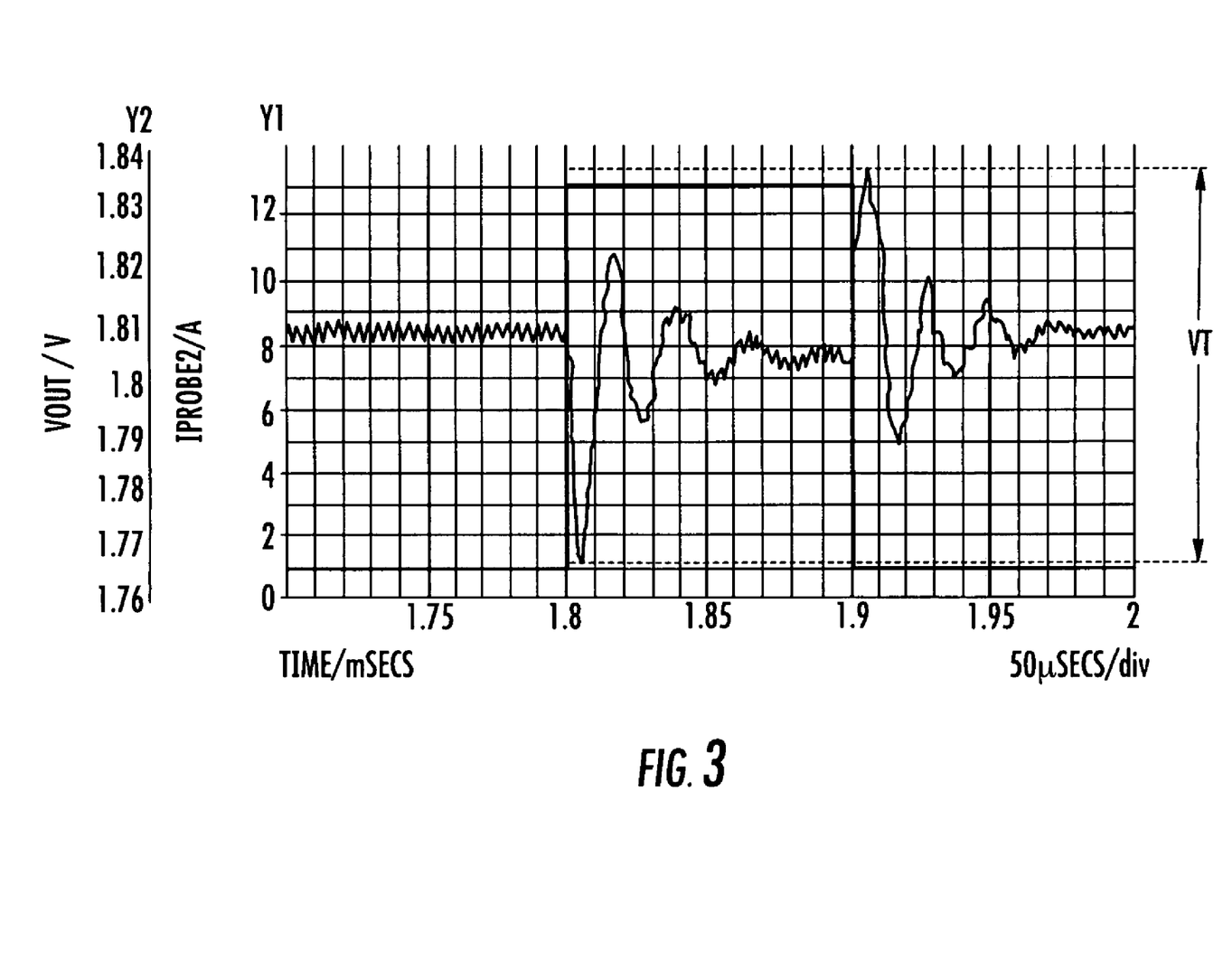
FIG. 3 is a plot of the regulated output voltage of FIG. 1 simulated for a step increase in the load current followed by a step decrease in the load current.

FIG. 3 is a plot of VOUT of FIG. 1 simulated for a 13 Ampere (A) step increase in the load current Io followed by a 13 A step decrease in Io, where VIN=10 Volts (V), Vref=1.76 V, L=1 microhenry ($\mu$H), Co=800 microfarads ($\mu$F), ESR=0, and $f_{SW}\approx$300 kilohertz (kH). The low value of ESR decreases the stability margin of the feedback loop, and thus causes transient "ringing" on VOUT in response to the step change in Io. Typically, a customer specifies the maximum voltage tolerance VT, which is the difference between the maximum droop of VOUT in response to a step increase in the load current Io and the maximum peak of VOUT in response to a step decrease in Io. In this example, the transient "ringing" on VOUT results in a VT of approximately 70 millivolts (mV). Because VT is inversely proportional to the value of the output filter capacitor Co, one typically chooses a value of Co large enough to provide the specified value of VT.

Some integrated-circuit (IC) manufacturers have developed constant-on-time topologies that allow the use of a low-ESR filter capacitor. But unfortunately, these topologies may require additional feedback and compensation circuitry and that the power-supply controller chip have an additional pin, and may yield a relatively poor regulation of VOUT.

SUMMARY

An embodiment of the invention is a power-supply controller that includes an adder and a control circuit. The adder generates a sum of a sense voltage and a regulated output voltage generated by a filter inductor. The sense voltage is generated by a sense circuit that sources a current to the filter inductor while the inductor is uncoupled from an input voltage, and the sense voltage is related to the sourced current. The control circuit couples the filter inductor to the input voltage for a predetermined time in response to the sum having a predetermined relationship to a reference voltage.

Such a power-supply controller may yield a relatively tight and stable regulation of the output voltage with a low-ESR filter capacitor, with no additional compensation components, and with no additional pin on the power-supply-controller chip.

BRIEF DESCRIPTION OF THE DRAWINGS

Features and advantages of the invention may best be understood by making reference to the following non-limiting description taken in conjunction with the accompanying drawings, in the several figures of which like references identify like elements.

DETAILED DESCRIPTION

In the following detailed description of exemplary embodiments of the invention, reference is made to the accompanying drawings, which form a part hereof. The detailed description and the drawings illustrate specific exemplary embodiments by which the invention may be practiced. These embodiments are described in sufficient detail to enable those skilled in the art to practice the invention. It is understood that other embodiments may be utilized, and other changes may be made, without departing from the spirit or scope of the invention. The following detailed description is therefore not to be taken in a limiting sense.

Figure 4:
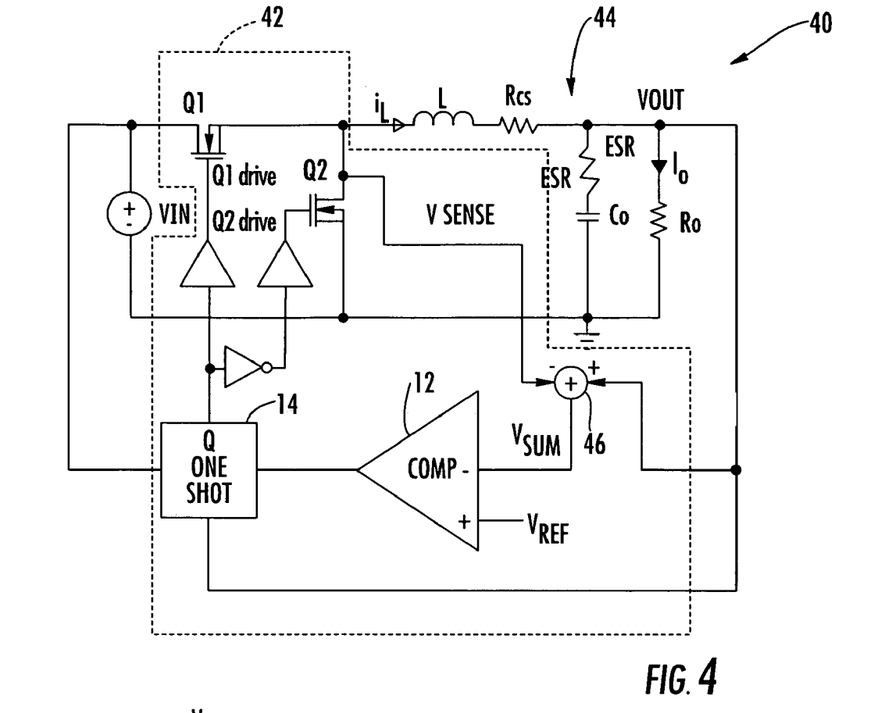
FIG. 4 is a schematic diagram of a constant-on-time power supply according to an embodiment of the invention.

FIG. 4 is a schematic diagram of a constant-on-time power supply 40 according to an embodiment of the invention. As further described below, the power supply 40 allows the use of a filter capacitor Co having an ESR of less than 40 mΩ, for example from approximately 0 mΩ-5 mΩ. Furthermore, the power supply 40 requires no additional pin on the power-supply controller integrated circuit (IC), requires no additional compensation circuitry, and yields a relatively tight regulation of VOUT as compared to prior constant-on-time supplies such as the supply 10 of FIG. 1. Moreover, for a given VT, the supply 40 may allow one to use a smaller filter capacitor Co than prior supplies such as the supply 10.

The supply 40 includes a power-supply controller IC 42 and a filter circuit 44, and provides a regulated output voltage VOUT to a load, which is represented by a resistor Ro.

In addition to the transistors Q1 and Q2, the comparator 12, and the one shot 14, the IC 42 includes an adder 46, which adds an inverse of a sense voltage $V_{sense}$ to VOUT, and which provides the result $V_{sum}$ to an inverting input node of the comparator 12. $V_{sense}$ effectively enhances or replaces the contribution to the feedback signal of the in-phase component of the VOUT ripple generated by ESR, and thus allows the power supply 40 to maintain a tight and stable regulation of VOUT even where ESR is relatively low or even near 0Ω. Furthermore, because the on resistance Rds(on) of the transistor Q2 generates $V_{sense}$ at the source of Q2, the adder 46 is the only additional circuitry that the IC 42 includes as compared to the power supply 10 of FIG. 1. In addition, because Q2 generates $V_{sense}$ internally, the IC 42 needs no additional pin to receive $V_{sense}$. Moreover, in an alternate embodiment where Q1 and Q2 are disposed external to the IC 42, a current-sense pin (not shown in FIG. 4) of the IC is typically connected to the source of Q2 for current-limiting purposes. Consequently, because the current-sense pin inherently receives $V_{sense}$, the IC 42 needs no additional pin to receive $V_{sense}$.

The filter circuit 44 includes the filter inductor L having an equivalent series resistance Rcs, and includes the output filter capacitor Co having a relatively low ESR.

Figure 5A:
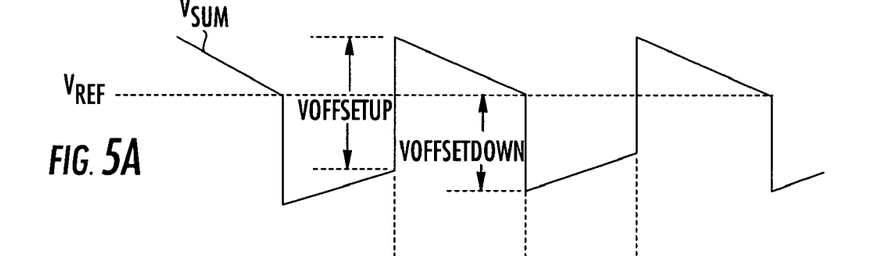
FIGS. 5A-5C are plots of voltages of the power supply of FIG. 4 according to an embodiment of the invention.
Figure 5B:
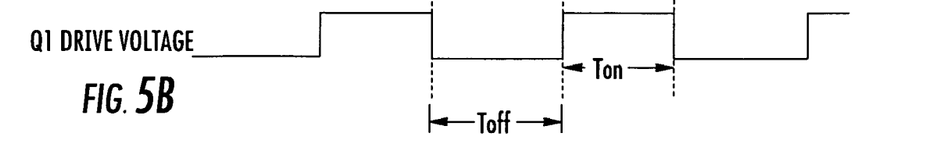
Figure 5C:
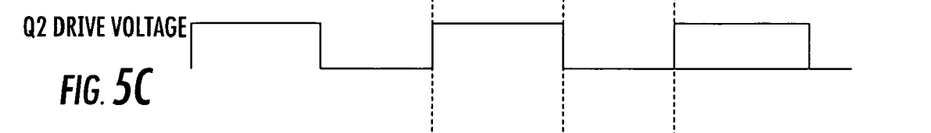

FIGS. 5A-5C are respective plots of the voltages $V_{sum}$ and Vref, $Q1_{drive}$, and $Q2_{drive}$ of FIG. 4 according to an embodiment of the invention. Although these voltages are shown having an approximately 50% duty cycle, they may have other duty cycles as discussed below.

Referring to FIGS. 4-5C, the operation of the power supply 40 is described according to an embodiment of the invention.

During a discharge time Toff, the transistor Q1 is deactivated and the transistor Q2 is activated such that the decaying current $I_L$ flowing through the inductor L also flows through the transistor Q2. As $I_L$ decays, $V_{sum}$ ramps downward toward Vref as shown in FIG. 5A.

When $V_{sum}$ ramps below Vref, the comparator 12 activates the one shot 14, which activates Q1 and deactivates Q2 for a predetermined "constant-on" charge time Ton, the value of which for a steady-state load is Ro given by the following equation $$\text{Ton} = \frac{K(VOUT) + I_L \cdot Q2_{Rds(on)}}{Vin} \quad (1)$$

where K is a constant that depends on the circuit topology and component values. The dependence of Ton on $I_L \cdot Q2_{Rds(on)}$ allows the switching frequency $f_{sw}$ to be substantially independent of the load current Io within a predetermined range of Io. That is, by changing Ton, and thus the switching duty cycle, the power supply 40 maintains $f_{sw}$ at a substantially constant frequency for a steady-state load Ro. Furthermore, because at the beginning of Ton the voltage $V_{sense}$ changes from a negative to a positive voltage with respect to ground, $V_{sum}$ "jumps" downward by a DC offset voltage $V_{offsetdown}$. The adder 46 may be designed to effectively "ignore" a positive $V_{sense}$ by assigning a predetermined value such as 0V to $V_{sense}$ when $V_{sense}$ is positive. For example, one may connect a diode (not shown) between the source of Q2 (cathode) and the inverting input of the adder 46 (anode) so that the diode blocks $V_{sense}$ where $V_{sense}$ is positive. Other current topologies for implementing this function are known, and therefore, are not described in detail.

During Ton, an increasing current $I_L$ flows from the input voltage Vin, through the transistor Q1 and the inductor L, and to the filter capacitor Co and the load Ro. As $I_L$ increases, VOUT, and thus $V_{sum}$, ramps upward.

After the elapse of the predetermined on time Ton, the one shot 14 deactivates the transistor Q1 and activates the transistor Q2 and the above-described cycle repeats. Because at the end of Ton $V_{sense}$ changes from a positive to a negative voltage, $V_{sum}$ "jumps" upward by a DC offset voltage $V_{offsetup}$. Furthermore, because $I_L$ is at a minimum at the beginning of Ton and at a maximum at the end of Ton, $V_{offsetdown}$ is typically less than $V_{offsetup}$, assuming that the adder 46 ignores $V_{sense}$ when $V_{sense}$ is positive as discussed above.

Referring to FIG. 4, although the adder 46 is shown inverting $V_{sense}$, the adder may have two noninverting inputs and the supply 40 may include an inverter or other circuitry to invert $V_{sense}$.

Figure 6:
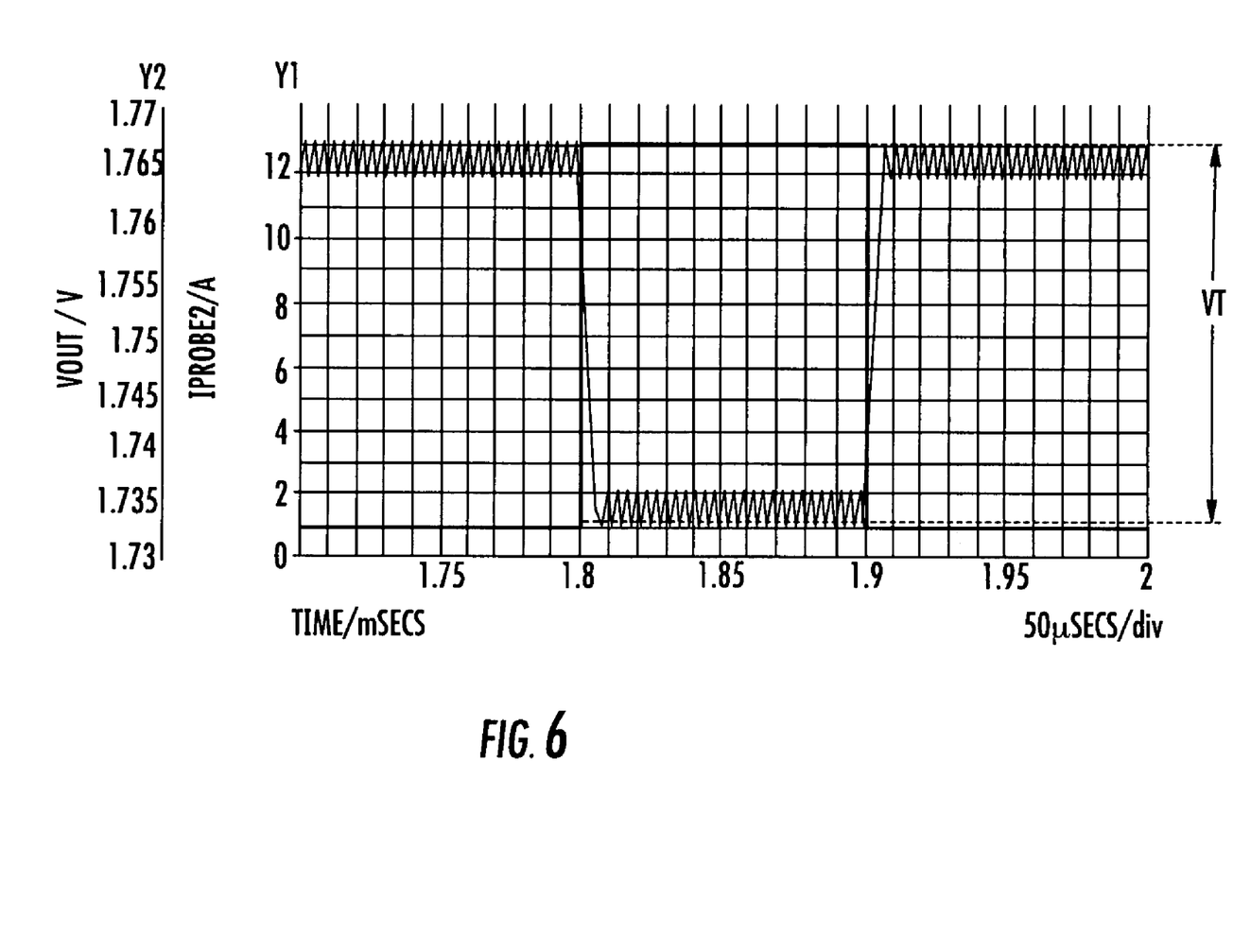
FIG. 6 is a plot of the regulated output voltage of FIG. 4 simulated for a step increase in the load current followed by a step decrease in the load current according to an embodiment of the invention.

FIG. 6 is a plot of VOUT of FIG. 4 simulated for a 13 Ampere (A) step increase in the load current lo followed by a 13 A step decrease in lo where Vin=10V, Vref=1.76V, L=1 microhenry (μH), Co=800 microfarads (μF), and ESR=0; these are the same parameters as plotted in FIG. 3 for the power supply 10 of FIG. 1. As compared to the supply 10, the modified topology of the power supply 40 stabilizes the supply so as to virtually eliminate transient "ringing" on VOUT in response to the step changes in the load current, and lowers VT from about 70 mV to about 35 mV. Because for the same parameters, the VT of the supply 40 is approximately ½ the VT of the supply 10, if one specifies a VT of 70 mV, then he can reduce the value of Co of the supply 40 to 400 μF, which is half the 800 μF value of Co of the supply 10. That is, using a Co=400 μF in the power supply 10 yields a VT of approximately 70 mV. This reduction in the value of Co may reduce the size and cost of Co as compared to the Co of the supply 10, and thus may reduce the size and cost of the supply 40 as compared to the supply 10.

Figure 7:
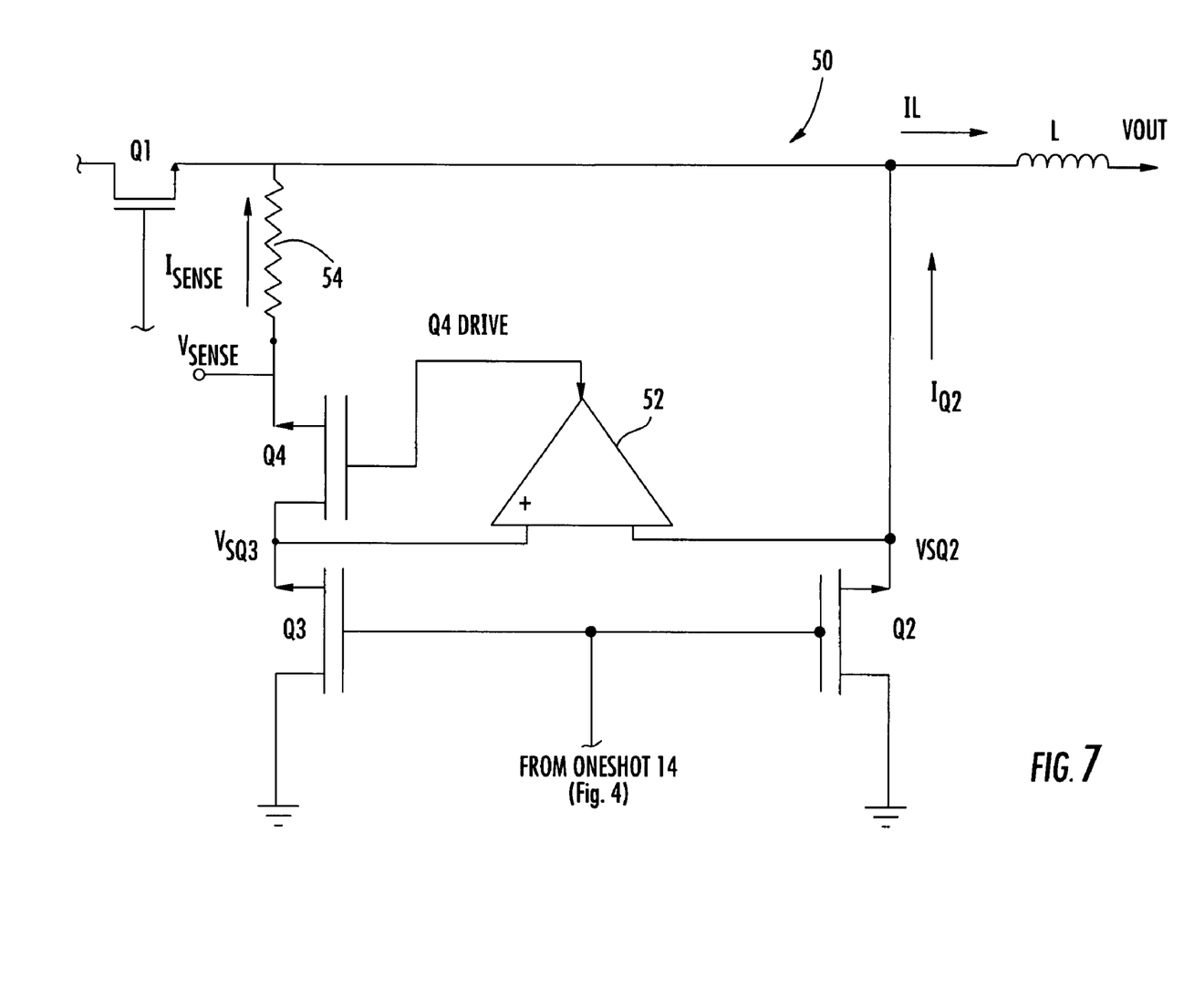
FIG. 7 is a schematic diagram of a temperature-stable circuit that the power supply of FIG. 4 can include to sense the inductor current during a discharge time Toff according to an embodiment of the invention.

FIG. 7 is a schematic diagram of a sensing circuit 50 and the portion of the power supply 40 of FIG. 1 to which the sensing circuit is connected according to an embodiment of the invention. The sensing circuit 50 can be included in the power supply 40 of FIG. 4 to provide a temperature-stable value for $V_{sense}$. That is, the circuit 50 reduces the sensitivity of $V_{sense}$ to temperature as compared to $V_{sense}$ being measured directly across Q2 as shown in FIG. 4. The circuit 50 may be entirely or partially disposed on the IC 42, or may be totally disposed external to the IC 42. However, where the sensing circuit 50 is disposed entirely on the IC 42, the components of the sensing circuit may be more closely matched to each other; therefore, the sensing circuit may provide $V_{sense}$ with a lower temperature sensitivity than where some or all of the components of the sensing circuit are disposed off chip.

In addition to the transistor Q2, the sensing circuit 50 includes transistors Q3 and Q4, a differential amplifier 52, and a resistive sense element 54, here a sense resistor. The transistors Q2 and Q3 have similar dimensions, and the gain G of the amplifier 52 and the value of the sense amplifier 54 are selected such that $I_{sense}/I_{Q2}$ is small, for example 1/1000. Also, the thermal response of Q2 closely matches that of Q3; a sufficient matching of the thermal response typically occurs where Q2 and Q3 are disposed on the same IC.

The operation of the sensing circuit 50 is now described in conjunction with FIGS. 4 and 7 according to an embodiment of the invention. For purposes of example, the temperature sensitivity of the resistor 54 is ignored, and the gain G of the amplifier and the value of the sense resistor 54 are selected such that $I_{sense}/I_{Q2} \approx 1/1000$.

When the one shot 14 (FIG. 4) deactivates the transistor Q1 and activates the transistor Q2 during the discharge time $T_{off}$ (FIG. 5B), the one shot also activates the transistor Q3.

The amplifier 52 generates an output signal $Q4_{drive}$ that equals $G(Vs_{Q3}-Vs_{Q2})$, where $Vs_{Q3}$ is the voltage at the source of the transistor Q3, and $Vs_{Q2}$ is the voltage at the source of the transistor Q2. Because Q2 and Q3 have similar dimensions and $I_{sense} \ll I_{Q2}$, $Vs_{Q2} < Vs_{Q3}$ for $I_{Q2} > 0$.

The signal $Q4_{drive}$ causes the transistor Q4 to source to the element 54 the current $I_{sense}$, which is proportional to $Vs_{Q3}-Vs_{Q2}$; consequently, $V_{sense}$ is also proportional to $Vs_{Q3}-Vs_{Q2}$. More specifically, because the transistor Q4 acts as a voltage follower, $I_{sense} \approx [G(Vs_{Q3}-Vs_{Q2})-Vt]/(sense\ element\ 54)$, where Vt is the threshold voltage of the transistor Q4. Furthermore, because $I_{sense}$ is relatively small, $Vs_{Q3}$ remains relatively constant as compared to $Vs_{Q2}$ such that $I_{sense}$ varies substantially linearly with $Vs_{Q2}$. And because $Vs_{Q2}$ is the voltage across the Rds(on) of Q2, and thus varies substantially linearly with $I_{Q2}$, $I_{sense}$ varies substantially linearly with $I_{Q2}$. Moreover, because $I_{sense} \ll I_{Q2}$, $I_{Q2}$ approximately equals $I_L$ (i.e., $I_{Q2} \approx I_L$); consequently, $I_{sense}$ varies substantially linearly with $I_L$, as is desired in this embodiment.

Because Q2 and Q3 are thermally matched, $Vs_{Q3}$ and $Vs_{Q2}$ shift by substantially the same amount in response to a change in temperature. But even with this temperature-induced shift, the difference between $Vs_{Q3}$ and $Vs_{Q2}$, and thus $Q4_{drive}$, $I_{sense}$, and $V_{sense}$, remain substantially unchanged with temperature for a given $I_L$. Put another way, the similar temperature-induced shifts in $Vs_{Q3}$ and $Vs_{Q2}$ compose a common-mode signal at the input nodes of the differential amplifier 52, which rejects this common-mode signal, thus rendering $V_{sense}$ less sensitive to temperature than if $V_{sense}$ were taken directly across the transistor Q2 as shown in FIG. 4.

Figure 8:
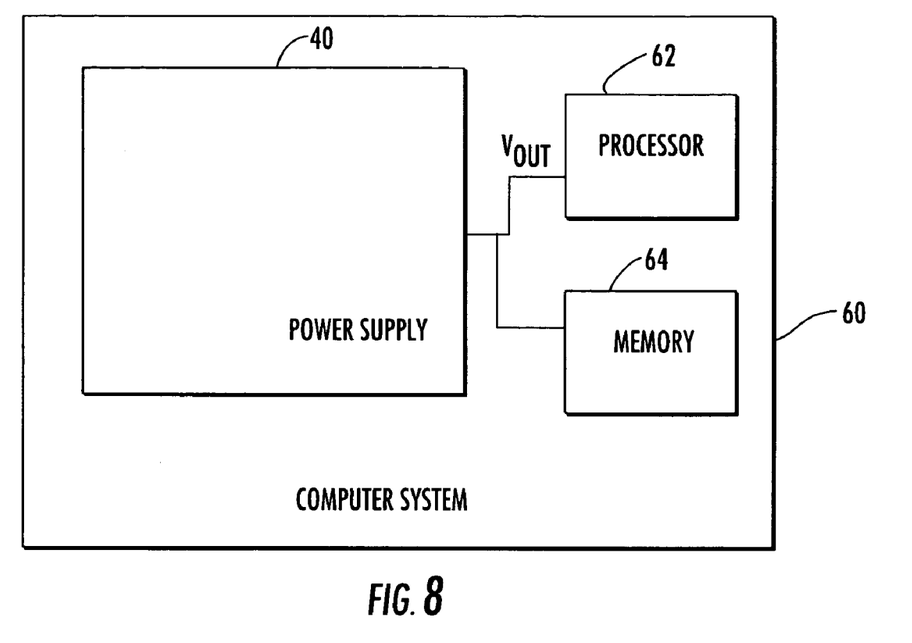
FIG. 8 is a block diagram of a computer system that can incorporate the power supply of FIG. 4 according to an embodiment of the invention.

FIG. 8 is a block diagram of a computer system 60, which can incorporate the power supply 40 of FIG. 4 according to an embodiment of the invention. The supply 40 may provide regulated voltage VOUT to a processor 62, a memory 64, or another component (not shown) of the computer system 60. Alternatively, the power supply 40 may be installed in any other type of electronic system.

Figure 9:
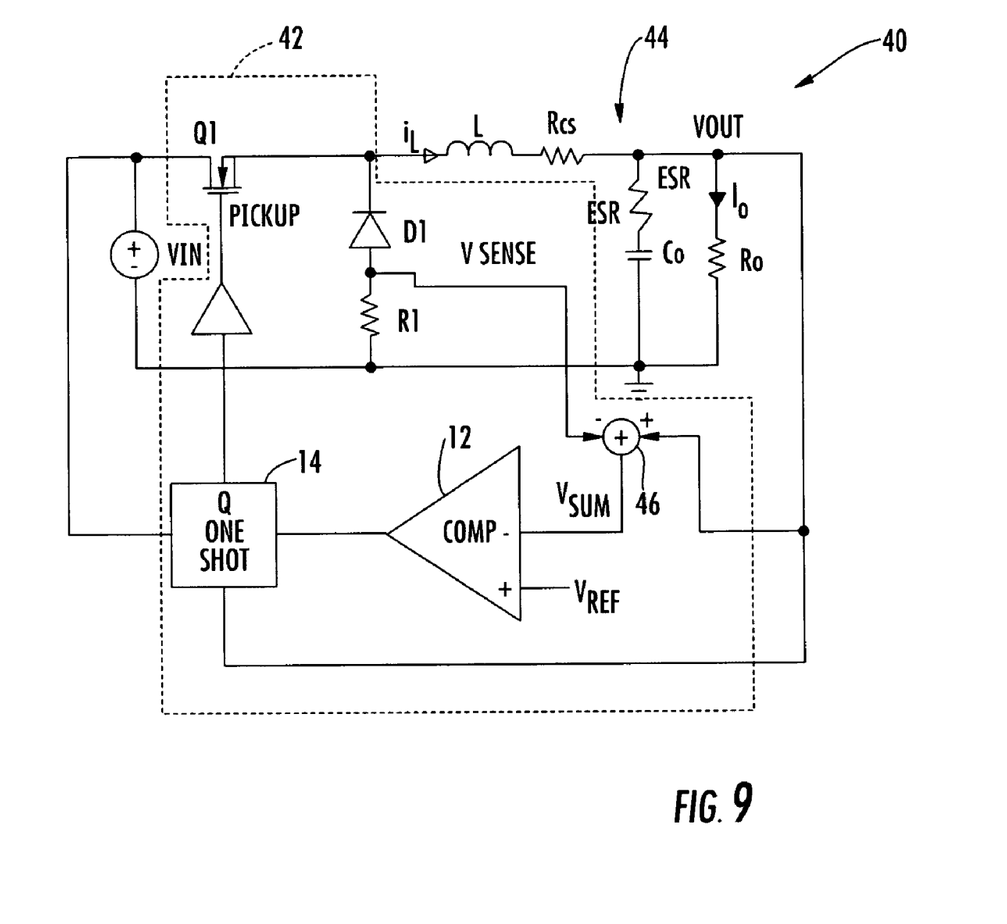
FIG. 9 is a schematic diagram of a constant-on-time power supply according to another embodiment of the invention.

FIG. 9 is a schematic diagram of an alternate embodiment of the supply 40, where the transistor Q2 is replaced with a diode D1 and a resistor or other resistive element R1. The voltage $V_{sense}$ may be taken across the R1 as shown, or may be taken across the combination of R1 and D1.

From the foregoing it will be appreciated that, although specific embodiments of the invention have been described herein for purposes of illustration, various modifications may be made without deviating from the spirit and scope of the invention.

What is claimed is:

1. A power-supply controller, comprising:
   an adder operable to generate a sum of a sense voltage and a regulated output voltage, the sense voltage generated by a sense circuit while sourcing a current to a filter inductor that is uncoupled from a first input voltage, the sense voltage related to the current, the filter inductor generating the regulated output voltage; and
   a control circuit coupled to the adder and operable to couple the filter inductor to the first input voltage for a predetermined time in response to the sum having a predetermined relationship to a reference voltage.

2. The power-supply controller of claim 1 wherein the adder is operable to invert the sense voltage and to generate the sum of the inverted sense voltage and the regulated output voltage.

3. The power-supply controller of claim 1 wherein the control circuit is operable to couple the filter inductor to the input voltage in response to the sum being less than the reference voltage.

4. The power-supply controller of claim 1, further comprising:
   the sense circuit including a return transistor operable to be coupled to the control circuit and between a second input voltage and the filter inductor; and
   a drive transistor operable to be coupled to the control circuit and operable to couple the inductor to the first input voltage in response to the control circuit.

5. The power-supply controller of claim 1, further comprising:
   the sense circuit including a return transistor operable to be coupled to the control circuit and between ground and the filter inductor; and
   a drive transistor operable to be coupled to the control circuit and operable to couple the inductor to the first input voltage in response to the control circuit.

6. The power-supply controller of claim 1 wherein the control circuit comprises a comparator operable to transition a comparison signal in response to the sum attaining the predetermined relationship to the threshold voltage, the control circuit operable to couple the input voltage to the inductor in response to the transition of the comparison signal.

7. A power-supply, comprising:
   an first input node operable to receive a first input voltage;
   an output node operable to carry a regulated output voltage;
   a second input node operable to receive a second input voltage;
   a filter inductor having a first node and having a second node coupled to the output node;
   a first transistor coupled between the first node of the filter inductor and the first input node;
   a sense circuit coupled between the first node of the inductor and the second input node and operable to generate a sense voltage that is related to a current flowing through the inductor while the first transistor is inactivated;
   an adder operable to generate a sum of the sense voltage and the regulated output voltage; and
   a control circuit operable to activate the first transistor for a predetermined time in response to the sum having a predetermined relationship to a reference voltage.

8. The power supply of claim 7 wherein the sense circuit:
   comprises a resistive element serially coupled between the first node of the inductor and the second input node and operable to conduct the current that flows through the inductor while the first transistor is inactivated; and
   is operable to generate the sense voltage equal to a voltage across the resistive element while the current flows through the resistive element.

9. The power supply of claim 7 wherein the sense circuit:
   comprises a resistive element and a diode serially coupled between the first node of the inductor and the second input node and operable to conduct the current that flows through the inductor while the first transistor is inactivated; and
   is operable to generate the sense voltage equal to a voltage across the resistive element while the current flows through the resistive element.

10. A power-supply, comprising:
    an first input node operable to receive a first input voltage;
    an output node operable to carry a regulated output voltage;
    a second input node operable to receive a second input voltage;
    a filter inductor having a first node and having a second node coupled to the output node;
    a first transistor coupled between the first node of the filter inductor and the first input node;
    a sense circuit coupled between the first node of the inductor and the second input node and operable to generate a sense voltage that is related to a current flowing through the inductor while the first transistor is inactivated;
    an adder operable to generate a sum of the sense voltage and the regulated output voltage;
    a control circuit operable to activate the first transistor for a predetermined time in response to the sum having a predetermined relationship to a reference voltage;
    wherein the sense circuit comprises a second transistor serially coupled between the first node of the inductor and the second input node and operable to conduct the current that flows through the inductor while the first transistor is inactivated, the sense circuit being operable to generate the sense voltage equal to a voltage across the second transistor while the current flows through the second transistor; and
    wherein the control circuit is operable to deactivate the first transistor and activate the second transistor after the predetermined time elapses.

11. A power-supply, comprising:
    an first input node operable to receive a first input voltage;
    an output node operable to carry a regulated output voltage;
    a second input node operable to receive a second input voltage;
    a filter inductor having a first node and having a second node coupled to the output node;
    a first transistor coupled between the first node of the filter inductor and the first input node;
    a sense circuit coupled between the first node of the inductor and the second input node and operable to generate a sense voltage that is related to a current flowing through the inductor while the first transistor is inactivated;
    an adder operable to generate a sum of the sense voltage and the regulated output voltage;
    a control circuit operable to activate the first transistor for a predetermined time in response to the sum having a predetermined relationship to a reference voltage;
    wherein the sense circuit comprises,
       a second transistor serially coupled between the first node of the inductor and the second input node and operable to conduct a first portion of the current that flows through the inductor while the first transistor is deactivated, the second transistor having a control node coupled to the control circuit and having a source node coupled to the inductor,
       a third transistor coupled to the second input node and having a control node coupled to the control node of the second transistor and having a source node,
       a fourth transistor coupled to the source node of the third transistor and having a control node and a source node,
       a resistive element serially coupled between the source node of the fourth transistor and the first node of the inductor and operable to conduct a second portion of the current that flows through the inductor while the first transistor is deactivated and to generate the sense voltage across the resistive element, and
       an amplifier having input nodes respectively coupled to the source nodes of the second and third transistors and having an output node coupled to the control node of the fourth transistor; and
    wherein the control circuit is operable to deactivate the first transistor and activate the second and third transistors after the predetermined time elapses.

12. The power supply of claim 7 wherein the adder is operable to invert the sense voltage and to generate the sum of the inverted sense voltage and the regulated output voltage.

13. The power supply of claim 7, further comprising:
    a comparator operable to transition a comparison signal in response to the sum being less than the reference voltage; and p1 wherein the control circuit is operable to activate the first transistor in response to the transition of the comparison signal.

14. The power supply of claim 7, further comprising a filter capacitor coupled between the output node and the second input node and having an equivalent series resistance that is less than forty milliohms.

15. The power supply of claim 7, further comprising a filter capacitor coupled between the output node and the second input node and having an equivalent series resistance that is less than five milliohms.

16. The power supply of claim 7 wherein the reference voltage is substantially constant.

17. The power supply of claim 7 wherein the second input voltage comprises ground.

18. An electronic system, comprising:
   a power-supply, comprising,
      a first input node operable to receive a first input voltage,
      an output node operable to carry a regulated output voltage,
      a second input node operable to receive a second input voltage,
      a filter inductor having a first node and having a second node coupled to the output node,
      a first transistor coupled between the first node of the filter inductor and the first input node,
      a sense circuit coupled between the first node of the inductor and the second input node and operable to generate a sense voltage that is related to a current flowing through the inductor while the first transistor is inactivated,
      an adder operable to generate a sum of the sense voltage and the regulated output voltage, and
      a control circuit operable to activate the first transistor for a predetermined time in response to the sum having a predetermined relationship to a reference voltage; and
   an electronic component coupled to the output node of the power supply.

19. A method, comprising:
   causing a discharge current to flow through a power-supply filter inductor that is coupled to a regulated output voltage;
   generating a sense voltage that is related to the discharge current with a circuit through which the discharge current flows;
   generating a sum of the sense voltage and the regulated output voltage; and
   causing a charge current to flow through the inductor for a predetermined time in response to the sum having a predetermined relationship to a reference voltage.

20. A method, comprising:
   causing a discharge current to flow through a power-supply filter inductor that is coupled to a regulated output voltage;
   generating a sense voltage that is related to the discharge current with a circuit through which the discharge current flows;
   generating a sum of the sense voltage and the regulated output voltage;
   causing a charge current to flow through the inductor for a predetermined time in response to the sum having a predetermined relationship to a reference voltage; and
   wherein generating the sense voltage comprises generating the sense voltage equal to a voltage across a transistor through which the discharge current flows.

21. The method of claim 19, further comprising reducing a sensitivity of the sense voltage to temperature.

22. The method of claim 19 wherein generating the sum comprises:
   inverting the sense voltage; and
   generating the sum equal to the sum of the inverted sense voltage and the regulated output voltage.

* * * * *

UNITED STATES PATENT AND TRADEMARK OFFICE
CERTIFICATE OF CORRECTION

| | | |
|---|---|---|
| PATENT NO. | : 7,439,721 B2 | Page 1 of 1 |
| APPLICATION NO. | : 11/443838 | |
| DATED | : October 21, 2008 | |
| INVENTOR(S) | : Da Feng Weng and Jinrong Qian | |

It is certified that error appears in the above-identified patent and that said Letters Patent is hereby corrected as shown below:

Column 8 line 65 remove "p1" before the word wherein

Signed and Sealed this

Thirtieth Day of December, 2008

JON W. DUDAS
*Director of the United States Patent and Trademark Office*